(12) United States Patent
Baldwin (10) Patent No.: US 12,283,804 B1
(45) Date of Patent: Apr. 22, 2025

(54) SCREWLESS LOOK JUNCTION BOX COVER PLATE AND BRACKET

(71) Applicant: Titan3 Technology LLC, Tempe, AZ (US)

(72) Inventor: Jeffrey P. Baldwin, Anthem, AZ (US)

(73) Assignee: Titan3 Technology LLC, Tempe, AZ (US)

( * ) Notice: Subject to any disclaimer, the term of this patent is extended or adjusted under 35 U.S.C. 154(b) by 179 days.

(21) Appl. No.: 18/109,716

(22) Filed: Feb. 14, 2023

Related U.S. Application Data (60) Provisional application No. 63/310,055, filed on Feb. 14, 2022.

(51) Int. Cl.
*H02G 3/14* (2006.01)

(52) U.S. Cl.
CPC ..................... *H02G 3/14* (2013.01)

(58) Field of Classification Search
CPC .. H02G 3/08; H02G 3/081; H02G 3/14; F21S 8/04; F21S 8/043; F21S 8/06; F21V 17/164; F21V 21/00; F21V 21/03
USPC ...... 174/66, 67, 50, 480, 481, 135; 220/241, 220/242, 3.2, 3.3, 3.8; 439/535, 536; D8/353; D13/177, 156
See application file for complete search history.

(56) References Cited

U.S. PATENT DOCUMENTS

| 6,740,813 | B1 * | 5/2004 | Gretz | H02G 3/20 33/528 |
|---|---|---|---|---|
| 7,456,358 | B2 * | 11/2008 | Swiencicki | H02G 3/14 174/67 |
| 7,902,458 | B2 * | 3/2011 | Eshelman | H02G 3/14 174/67 |
| 8,148,635 | B1 * | 4/2012 | Gretz | H02G 3/123 174/53 |
| 9,702,533 | B1 * | 7/2017 | Harpenau | F21V 21/03 |
| 9,903,548 | B2 * | 2/2018 | Creasman | G08G 1/095 |
| 9,958,120 | B2 * | 5/2018 | Liu | F21S 8/02 |
| 10,612,756 | B1 * | 4/2020 | Hsu | F21V 21/03 |
| 10,907,807 | B1 * | 2/2021 | Hsu | F21S 8/04 |

* cited by examiner

*Primary Examiner* — Angel R Estrada
(74) *Attorney, Agent, or Firm* — Jeffrey D. Merrill; Kenneth C. Booth; Booth Udall Fuller, PLC (57) ABSTRACT

An electrical junction box cover plate assembly with an electrical junction box and a cover attachment bar. Each end of the cover attachment bar has an attachment screw aperture that aligns with a mounting screw aperture of the electrical junction box. A cover plate has an upper side with a cavity, an annular lip extending inward into the cavity, and at least two entry ports extending through the annular lip, each configured to receive one of the two ends of the cover attachment bar. When the ends of the cover attachment bar are inserted into the entry ports, the cover plate is rotatable with respect to the cover attachment bar and the electrical junction box to interlock extensions of the two ends with the annular lip of the cover plate to conceal the electrical junction box, the cover attachment bar, and the screws.

20 Claims, 6 Drawing Sheets

SCREWLESS LOOK JUNCTION BOX COVER PLATE AND BRACKET

CROSS REFERENCE TO RELATED APPLICATIONS

This application claims the benefit of the filing date of U.S. Provisional Patent Application 63/310,055 entitled "Screwless Look Junction Box Cover Plate and Bracket" to Jeffrey P. Baldwin that was filed on Feb. 14, 2022, the disclosure of which is hereby incorporated herein by this reference.

TECHNICAL FIELD

Aspects of this document relate generally to junction box cover plates, and more specifically to a screwless look junction box cover plate.

BACKGROUND

Electrical junction boxes are used to house electrical wires in a ceiling or wall. These boxes are exposed through the ceiling or wall to provide access to the electrical that they house. In most cases, there is no need to cover the electrical junction box because the electrical wires are coupled to a ceiling light, electrical outlet, light switch or other electrical device and these electrical devices, some with corresponding wall plates, cover the electrical junction box. However, in cases where the electrical wires are not in use, the electrical junction box is left exposed and is unsightly.

SUMMARY

Aspects of this document relate to an electrical junction box cover plate assembly comprising an electrical junction box configured to house electrical wires, the electrical junction box having a plurality of mounting screw apertures extending into the electrical junction box, a cover attachment bar having an elongated shape with two ends, wherein each of the two ends has an attachment screw aperture configured to align with one of the plurality of mounting screw apertures of the electrical junction box and an extension extending outward from the end, a plurality of screws each configured to extend through one of the attachment screw apertures and into one of the plurality of mounting screw apertures to attach the cover attachment bar to the electrical junction box, and a cover plate having an upper side with a cavity, wherein the upper side is configured to face the electrical junction box and has an annular lip extending inward into the cavity and at least two entry ports extending through the annular lip, each of the at least two entry ports configured to receive one of the two ends of the cover attachment bar, wherein, when the two ends of the cover attachment bar are inserted into the at least two entry ports, the cover plate is rotatable with respect to the cover attachment bar and the electrical junction box to interlock the extensions of the two ends of the cover attachment bar with the annular lip of the cover plate, wherein, when the extensions are interlocked with the annular lip, the cover plate is configured to conceal the electrical junction box, the cover attachment bar, and the plurality of screws.

Particular embodiments may comprise one or more of the following features. The annular lip may be shaped to form a threaded surface in the cavity and when the cover plate is rotated in a first direction with respect to the cover attachment bar, the cover plate threads onto the cover attachment bar. The cover plate may provide a screwless look to the cover plate assembly. Each extension of the cover attachment bar may include a cross section smaller than a cross section of a main portion of the cover attachment bar.

Aspects of the disclosure relate to an electrical junction box cover plate assembly comprising a cover attachment bar having two ends, wherein each of the two ends has an attachment screw aperture extending therethrough, a plurality of screws each configured to extend through one of the attachment screw apertures and into an electrical junction box to attach the cover attachment bar to the electrical junction box, and a cover plate having an upper side with a cavity, an annular lip extending inward into the cavity, and at least two entry ports extending through the annular lip, each of the at least two entry ports configured to receive one of the two ends of the cover attachment bar, wherein, when the two ends of the cover attachment bar are inserted into the at least two entry ports, the cover plate is rotatable with respect to the cover attachment bar to interlock the two ends of the cover attachment bar with the annular lip of the cover plate, wherein, when the cover attachment bar is attached to the electrical junction box and the two edges are interlocked with the annular lip, the cover plate is configured to conceal the electrical junction box, the cover attachment bar, and the plurality of screws.

Particular embodiments may comprise one or more of the following features. The electrical junction box may have a plurality of mounting screw apertures extending into the electrical junction box and wherein each of the attachment screw apertures is configured to align with one of the plurality of mounting screw apertures. The cover attachment bar may have an elongated shape. Each of the two ends may have an extension extending outward from the end and wherein, when the two ends are inserted into the at least two entry ports and the cover plate is rotated with respect to the cover attachment bar, the extensions interlock with the annular lip of the cover plate. Each extension of the cover attachment bar may have a cross section smaller than a cross section of a main portion of the cover attachment bar. The annular lip may be shaped to form a threaded surface in the cavity and when the cover plate is rotated in a first direction with respect to the cover attachment bar, the cover plate threads onto the cover attachment bar. The cover plate may provide a screwless look to the cover plate assembly.

Aspects of this disclosure relate to an electrical junction box cover plate assembly comprising a cover attachment bar configured to fixedly attach to an electrical junction box, and a cover plate having an upper side with a cavity, a lip extending inward into the cavity, and at least one entry port extending through the lip, each of the at least one entry port configured to receive a portion of the cover attachment bar, wherein, when the portion of the cover attachment bar is inserted into the at least one entry port, the cover plate is rotatable with respect to the cover attachment bar to interlock the cover attachment bar with the lip of the cover plate, wherein, when the cover attachment bar is attached to the electrical junction box and the cover attachment bar is interlocked with the lip, the cover plate is configured to conceal the electrical junction box and the cover attachment bar.

Particular embodiments may comprise one or more of the following features. The cover attachment bar may have two ends, the at least one entry port is at least two entry ports, and each of the at least two entry ports is configured to receive one of the two ends of the cover attachment bar. Each of the two ends may have an extension extending outward from the end and wherein, when the two ends are inserted into the at least two entry ports and the cover plate is rotated with respect to the cover attachment bar, the extensions interlock with the annular lip of the cover plate. Each extension of the cover attachment bar may have a cross section smaller than a cross section of a main portion of the cover attachment bar. A plurality of screws each configured to extend through the cover attachment bar and into the electrical junction box to attach the cover attachment bar to the electrical junction box. The electrical junction box may have a plurality of mounting screw apertures extending into the electrical junction box and wherein each of a plurality of attachment screw apertures of the cover attachment bar is configured to align with one of the plurality of mounting screw apertures. The cover attachment bar may have an elongated shape. The lip may be shaped to form a threaded surface in the cavity and when the cover plate is rotated in a first direction with respect to the cover attachment bar, the cover plate threads onto the cover attachment bar. The cover plate may provide a screwless look to the cover plate assembly.

The foregoing and other aspects, features, and advantages will be apparent from the specification, drawings, and the claims.

BRIEF DESCRIPTION OF THE DRAWINGS

Implementations will hereinafter be described in conjunction with the appended drawings, where like designations denote like elements, and.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

Detailed aspects and applications of the disclosure are described below in the following drawings and detailed description of the technology. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the disclosure. It will be understood, however, by those skilled in the relevant arts, that embodiments of the technology disclosed herein may be practiced without these specific details. It should be noted that there are many different and alternative configurations, devices and technologies to which the disclosed technologies may be applied. The full scope of the technology disclosed herein is not limited to the examples that are described below.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

As required, detailed embodiments of the present disclosure are included herein. It is to be understood that the disclosed embodiments are merely exemplary of the invention that may be embodied in various forms. Therefore, specific structural and functional details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, devices, methods, applications, conditions, or parameters described and/or shown herein, and that the terminology used herein is for the purpose of describing particular embodiments by way of example only and is not intended to be limiting of the claimed inventions. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

More specifically, this disclosure, its aspects and embodiments, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

Figure 1:
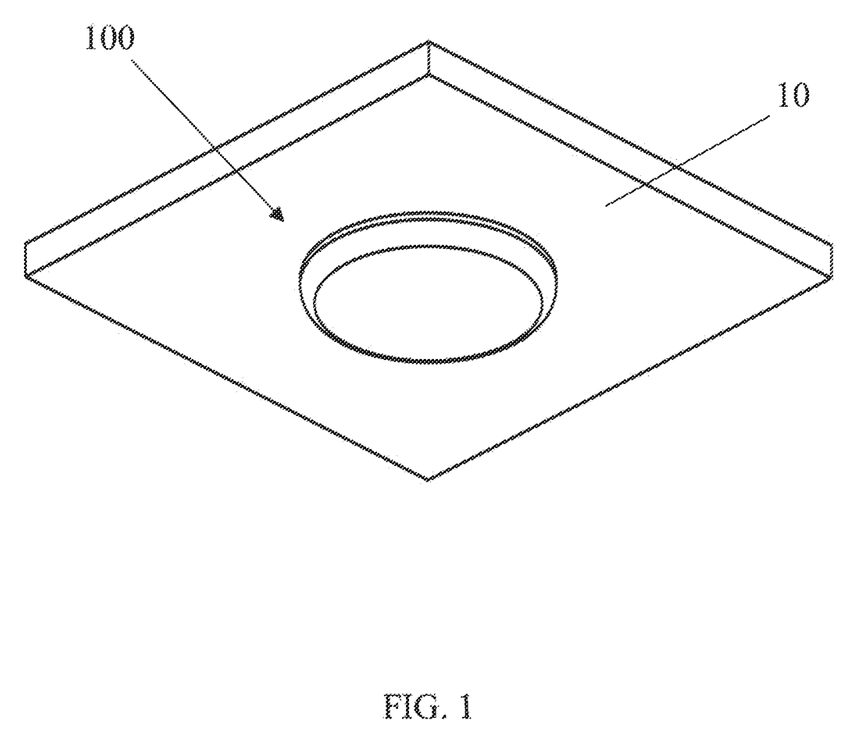
FIG. 1 is a perspective view of an electrical junction box cover plate assembly installed on a ceiling.
Figure 2:
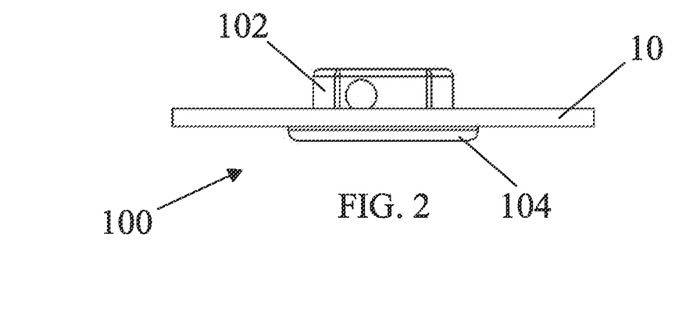
FIG. 2 is a side view of the cover plate assembly shown in FIG. 1.
Figure 3:
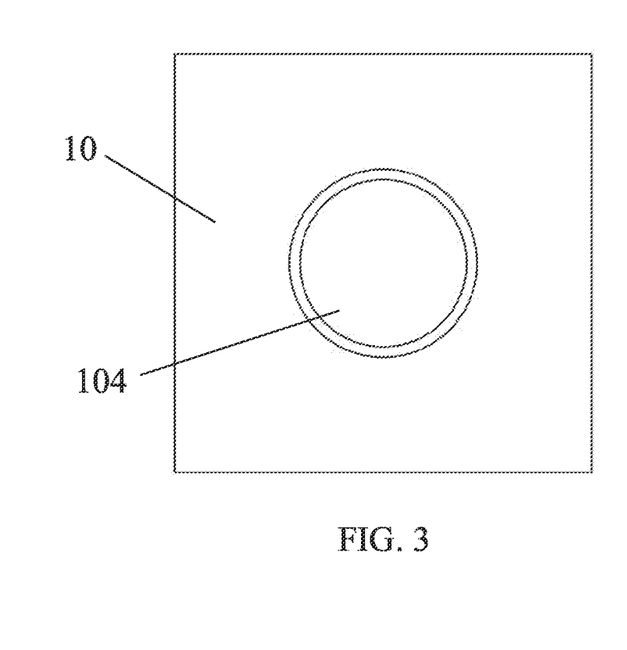
FIG. 3 is a bottom view of the cover plate assembly shown in FIG. 1.
Figure 4:
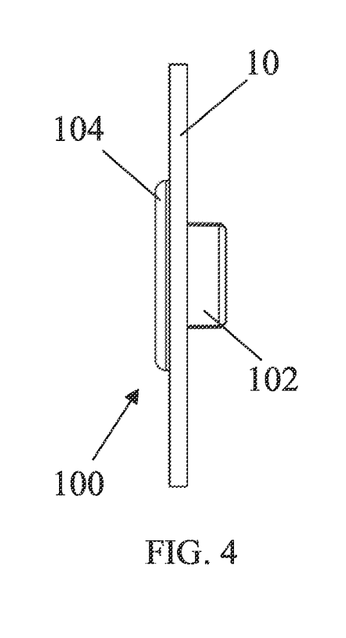
FIG. 4 is another side view of the cover plate assembly shown in FIG. 1.
Figure 5:
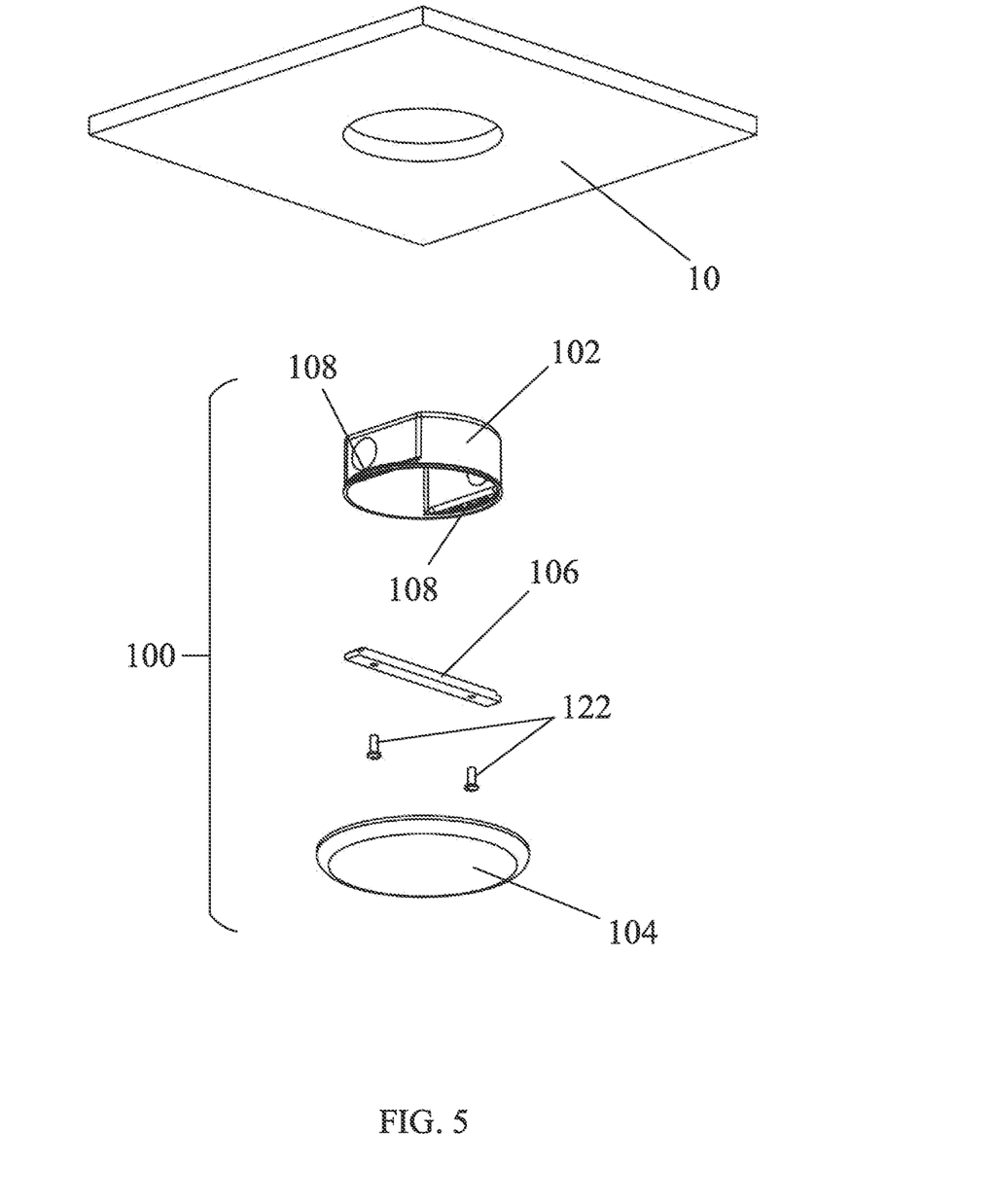
FIG. 5 is an exploded view of the cover plate assembly shown in FIG. 1.
Figure 6:
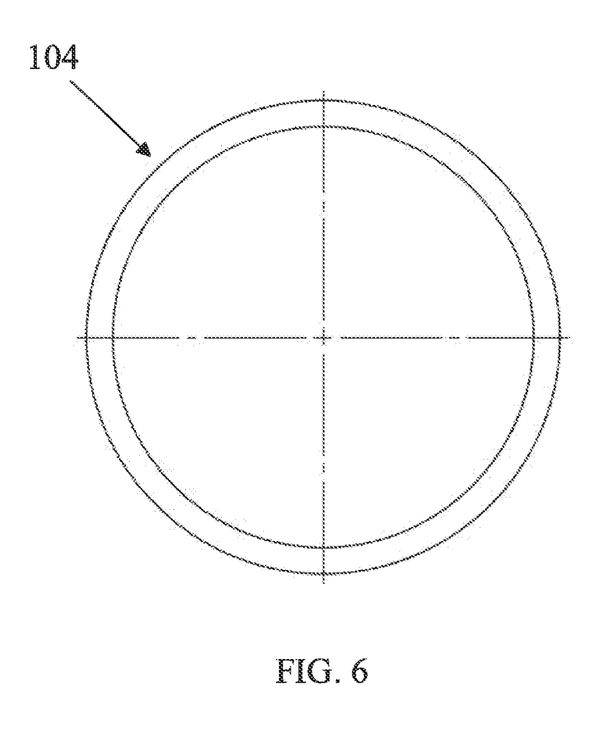
FIG. 6 is a bottom view of a cover plate of the cover plate assembly shown in FIG. 1.
Figure 7:
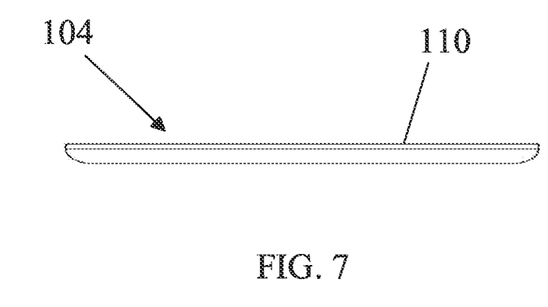
FIG. 7 is a side view of the cover plate shown in FIG. 6.
Figure 8:
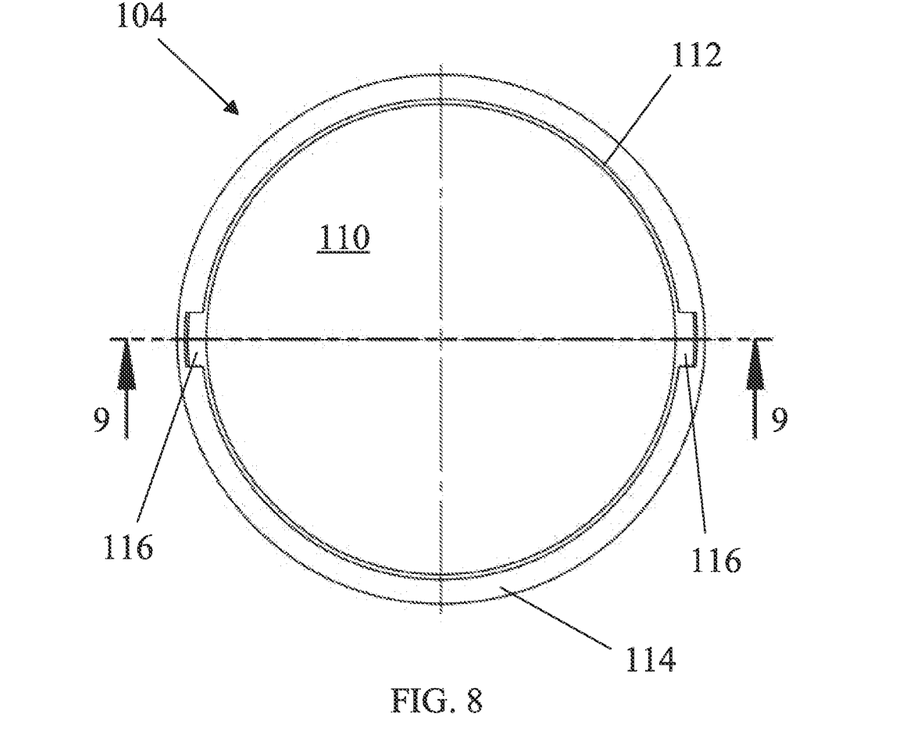
FIG. 8 is a top view of the cover plate shown in FIG. 6.

The present disclosure is related to an electrical junction box cover plate assembly 100. The cover plate assembly 100 is configured to cover an electrical junction box 102 without having exposed screws or other fasteners, thus providing a screwless look to the cover plate assembly 100, as shown in FIGS. 1-4. The cover plate assembly 100 comprises a cover plate 104 and may also comprise a cover attachment bar 106 and/or the electrical junction box 102, as shown in FIG. 5. The electrical junction box 102 is configured to house electrical wires (not shown) and may be any electrical junction box known in the art. For example, the electrical junction box 102 may be a ceiling junction box, a wall junction box, or any other junction box. Similarly, the electrical junction box 102 may be any shape, such as rectangular or circular. The electrical junction box 102 may have mounting screw apertures 108 extending into the electrical junction box 102. The mounting screw apertures 108 allow screws to be used to attach additional components to the electrical junction box 102.

The cover plate 104 is configured to cover the electrical junction box 102. The cover plate 104 may be circular and may have a flattened shape. This allows the cover plate 104 to cover the electrical junction box 102 without excessively protruding from the wall or ceiling 10 (see FIGS. 1-4). Turning to FIGS. 6-9, the cover plate 104 has an upper side 110 configured to face the electrical junction box 102 and couple with the electrical junction box 102. In some embodiments, the upper side 110 has a cavity 112. The cavity 112 may be shallow, with a depth of less than one inch, ½ inch, or ¼ inch. An annular lip 114 may extend inward into the cavity 112, or, in embodiments without a cavity 112, may extend upward from the upper side 110. The annular lip 114 creates a channel 115 between the annular lip 114 and the cover plate 104. The annular lip 114 is configured to engage with the electrical junction box 102 or a component coupled to the electrical junction box 102 to hold the cover plate 104 to the electrical junction box 102 by holding the electrical junction box 102 or the component coupled to the electrical junction box 102 in the channel 115. One or more entry ports 116 may extend through the annular lip 114. The entry ports 116 allow a component of the cover plate assembly 100 that has a dimension similar to the diameter of the annular lip 114 to insert into the entry ports 116 past the annular lip 114 and into the channel 115, thus interlocking with the annular lip 114. In some embodiments, the cover plate 104 has one entry port 116, while in other embodiments, the cover plate has at least two entry ports 116 or a plurality of entry ports 116.

Figure 10:
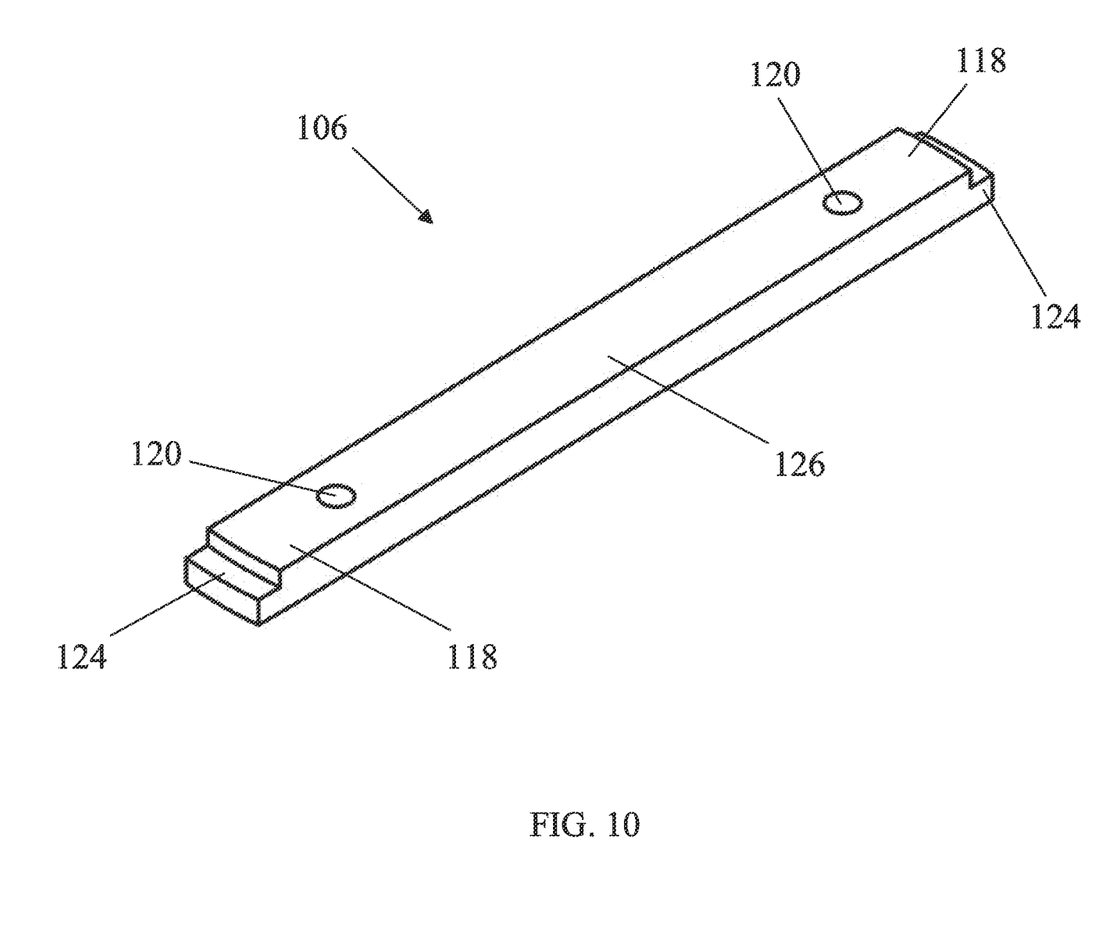
FIG. 10 is a perspective view of a cover attachment bar of the cover plate assembly shown in FIG. 1.

As mentioned above, the cover plate assembly 100 may also have a cover attachment bar 106. The cover attachment bar 106 is configured to allow the cover plate 104 to couple with the electrical junction box 102. Because many electrical junction boxes 102 do not have a structure that allows the cover plate 104 to attach to the electrical junction box 102 without the use of screws, the cover attachment bar 106 may be attached to the electrical junction box 102 to provide that structure. The cover attachment bar 106 may have an elongated shape and may have two ends 118, as shown in FIG. 10. Other shapes for the cover attachment bar 106 are also contemplated. The ends 118 of the cover attachment bar 106 may each have an attachment screw aperture 120. Each of the attachment screw apertures 120 is configured to align with one of the mounting screw apertures 108. As shown in FIG. 5, this allows screws 122 to be inserted through one of the attachment screw apertures 120 and into one of the mounting screw apertures 108 to attach the cover attachment bar 106 to the electrical junction box 102. Once the cover attachment bar 106 is attached to the electrical junction box 102, the cover plate 104 can be attached to the cover attachment bar 106 to cover the electrical junction box 102.

The entry ports 116 may be configured to receive the cover attachment bar 106 and allow the annular lip 114 to engage with the cover attachment bar 106. The cover attachment bar 106 may be sized to interlock with the annular lip 114. Thus, the cover attachment bar 106 may be short enough to fit within the annular lip 114 when aligned with the entry ports 116 and long enough that once the ends 118 of the cover attachment bar 106 are past the annular lip 114, the cover attachment bar 106 can move within the channel 115 and interlock with the annular lip 114. Thus, when the ends 118 of the cover attachment bar 106 are inserted into the entry ports 116, the cover plate 104 may be rotatable with respect to the cover attachment bar 106 and the electrical junction box 102. By rotating the cover plate 104, the ends 118 of the cover attachment bar 106 move within the channel 115 and become misaligned with the entry ports 116, thus interlocking the ends 118 of the cover attachment bar 106 with the annular lip 114 and coupling the cover plate 104 in a position to conceal the electrical junction box 102, the cover attachment bar 106, and/or the screws 122 used to attach the cover attachment bar 106 to the electrical junction box 102. In this way, only the cover plate 104 is visible, presenting a more aesthetically pleasing cover than would be possible if the screws 122 were visible. Thus, the cover plate 104 may provide a screwless look to the cover plate assembly 100.

In some embodiments, each end 118 of the cover attachment bar 106 has an extension 124 extending outward from the end 118. The extensions 124 may be configured to interlock with the annular lip 114. For example, the extensions 124 may be specially shaped and/or sized to interlock with the annular lip 114. In some embodiments, each extension 124 has a cross section that is smaller than a cross section of a main portion 126 of the cover attachment bar 106, as shown in FIG. 10.

Figure 9:
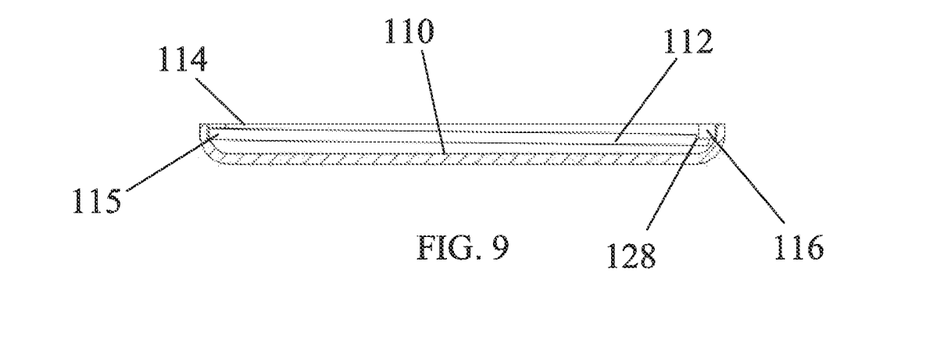
FIG. 9 is a cross section of the cover plate taken from line 9-9 in FIG. 8.

In some cases, it is desirable for the cover plate 104 to tighten onto the electrical junction box 102 as the cover plate 104 is rotated. To this end, the annular lip 114 may be shaped to form a threaded surface. For example, the channel 115 may be angled so that the annular lip 114 gets progressively thicker further away from the entry ports 116. As shown in FIG. 9 on the left side of the figure, the annular lip 114 is thinner than on the right side of the figure. Thus, as the cover plate 104 is rotated with respect to the cover attachment bar 106 in a first direction, the cover plate 104 threads onto the cover attachment bar 106 and tightens up against the electrical junction box 102. The annular lip 114 may include a stop 128 adjacent the entry ports 116 to signal to the user when the cover plate 104 has been tightened all the way, as shown in FIG. 9. When the cover plate 104 is rotated with respect to the cover attachment bar 106 in a second direction opposite the first direction, the cover plate 104 loosens from the electrical junction box 102 and can be released from the cover attachment bar 106 once the ends 118 of the cover attachment bar 106 align with the entry ports 116. Thus, the cover plate 104 may be configured to threadedly engage with the ends 118 of the cover attachment bar 106.

As mentioned above, when the cover plate 104 is coupled to the electrical junction box 102 either directly or through the cover attachment bar 106, the cover plate 104 is configured to conceal the electrical junction box 102, the cover attachment bar 106, and/or the screws 122 used to attach the cover attachment bar 106 to the electrical junction box 102. In this way, only the cover plate 104 is visible, providing a screwless look to the cover plate assembly 100.

It will be understood that implementations of a cover plate assembly are not limited to the specific assemblies, devices and components disclosed in this document, as virtually any assemblies, devices and components consistent with the intended operation of a cover plate assembly may be used. Accordingly, for example, although particular cover plate assemblies, and other assemblies, devices and components are disclosed, such may include any shape, size, style, type, model, version, class, measurement, concentration, material, weight, quantity, and/or the like consistent with the intended operation of cover plate assemblies. Implementations are not limited to uses of any specific assemblies, devices and components; provided that the assemblies, devices and components selected are consistent with the intended operation of a cover plate assembly.

Accordingly, the components defining any cover plate assembly may be formed of any of many different types of materials or combinations thereof that can readily be formed into shaped objects provided that the materials selected are consistent with the intended operation of a cover plate assembly. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various cover plate assemblies may be manufactured using conventional procedures as added to and improved upon through the procedures described here. Some components defining a cover plate assembly may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling cover plate assemblies are not limited to the specific order of steps as disclosed in this document. Any steps or sequence of steps of the assembly of a cover plate assembly indicated herein are given as examples of possible steps or sequence of steps and not as limitations, since various assembly processes and sequences of steps may be used to assemble cover plate assemblies.

The implementations of a cover plate assembly described are by way of example or explanation and not by way of limitation. Rather, any description relating to the foregoing is for the exemplary purposes of this disclosure, and implementations may also be used with similar results for a variety of other applications employing a cover plate assembly.

What is claimed is:

1. An electrical junction box cover plate assembly comprising:
    an electrical junction box configured to house electrical wires, the electrical junction box having a plurality of mounting screw apertures extending into the electrical junction box;
    a cover attachment bar having an elongated shape with two ends, wherein each of the two ends has an attachment screw aperture configured to align with one of the plurality of mounting screw apertures of the electrical junction box and an extension extending outward from the end;
    a plurality of screws each configured to extend through one of the attachment screw apertures and into one of the plurality of mounting screw apertures to attach the cover attachment bar to the electrical junction box; and
    a cover plate having an upper side with a cavity, wherein the upper side is configured to face the electrical junction box, the cavity is configured to open toward the electrical junction box, and the upper side has an annular lip extending inward from an outer edge of the cover plate into the cavity and at least two entry ports extending through the annular lip, each of the at least two entry ports configured to receive one of the two ends of the cover attachment bar, wherein, when the two ends of the cover attachment bar are inserted into the at least two entry ports, the cover plate is rotatable with respect to the cover attachment bar and the electrical junction box to interlock the extensions of the two ends of the cover attachment bar with the annular lip of the cover plate;
    wherein, when the extensions are interlocked with the annular lip, the cover plate is configured to conceal the electrical junction box, the cover attachment bar, and the plurality of screws such that only the cover plate is visible.

2. The electrical junction box cover plate assembly of claim 1, wherein the annular lip is shaped to form a threaded surface in the cavity and when the cover plate is rotated in a first direction with respect to the cover attachment bar, the cover plate threads onto the cover attachment bar.

3. The electrical junction box cover plate assembly of claim 1, wherein the cover plate provides a screwless look to the cover plate assembly.

4. The electrical junction box cover plate assembly of claim 1, wherein each extension of the cover attachment bar has a cross section smaller than a cross section of a main portion of the cover attachment bar.

5. An electrical junction box cover plate assembly comprising:
- a cover attachment bar having two ends, wherein each of the two ends has an attachment screw aperture extending therethrough;
- a plurality of screws each configured to extend through one of the attachment screw apertures and into an electrical junction box to attach the cover attachment bar to the electrical junction box; and
- a cover plate having an upper side with a cavity configured to open toward the electrical junction box, an annular lip extending inward from an outer edge of the cover plate into the cavity, and at least two entry ports extending through the annular lip, each of the at least two entry ports configured to receive one of the two ends of the cover attachment bar, wherein, when the two ends of the cover attachment bar are inserted into the at least two entry ports, the cover plate is rotatable with respect to the cover attachment bar to interlock the two ends of the cover attachment bar with the annular lip of the cover plate;
- wherein, when the cover attachment bar is attached to the electrical junction box and the two edges are interlocked with the annular lip, the cover plate is configured to conceal the electrical junction box, the cover attachment bar, and the plurality of screws such that only the cover plate is visible.

6. The electrical junction box cover plate assembly of claim 5, further comprising the electrical junction box, wherein the electrical junction box has a plurality of mounting screw apertures extending into the electrical junction box and wherein each of the attachment screw apertures is configured to align with one of the plurality of mounting screw apertures.

7. The electrical junction box cover plate assembly of claim 5, wherein the cover attachment bar has an elongated shape.

8. The electrical junction box cover plate assembly of claim 5, wherein each of the two ends has an extension extending outward from the end and wherein, when the two ends are inserted into the at least two entry ports and the cover plate is rotated with respect to the cover attachment bar, the extensions interlock with the annular lip of the cover plate.

9. The electrical junction box cover plate assembly of claim 8, wherein each extension of the cover attachment bar has a cross section smaller than a cross section of a main portion of the cover attachment bar.

10. The electrical junction box cover plate assembly of claim 5, wherein the annular lip is shaped to form a threaded surface in the cavity and when the cover plate is rotated in a first direction with respect to the cover attachment bar, the cover plate threads onto the cover attachment bar.

11. The electrical junction box cover plate assembly of claim 5, wherein the cover plate provides a screwless look to the cover plate assembly.

12. An electrical junction box cover plate assembly comprising:
- a cover attachment bar configured to fixedly attach to an electrical junction box; and
- a cover plate having an upper side with a cavity configured to open toward the electrical junction box, a lip extending inward from an outer edge of the cover plate into the cavity, and at least one entry port extending through the lip, each of the at least one entry port configured to receive a portion of the cover attachment bar, wherein, when the portion of the cover attachment bar is inserted into the at least one entry port, the cover plate is rotatable with respect to the cover attachment bar to interlock the cover attachment bar with the lip of the cover plate;
- wherein, when the cover attachment bar is attached to the electrical junction box and the cover attachment bar is interlocked with the lip, the cover plate is configured to conceal the electrical junction box and the cover attachment bar such that only the cover plate is visible.

13. The electrical junction box cover plate assembly of claim 12, wherein the cover attachment bar has two ends, the at least one entry port is at least two entry ports, and each of the at least two entry ports is configured to receive one of the two ends of the cover attachment bar.

14. The electrical junction box cover plate assembly of claim 13, wherein each of the two ends has an extension extending outward from the end and wherein, when the two ends are inserted into the at least two entry ports and the cover plate is rotated with respect to the cover attachment bar, the extensions interlock with the annular lip of the cover plate.

15. The electrical junction box cover plate assembly of claim 14, wherein each extension of the cover attachment bar has a cross section smaller than a cross section of a main portion of the cover attachment bar.

16. The electrical junction box cover plate assembly of claim 12, further comprising a plurality of screws each configured to extend through the cover attachment bar and into the electrical junction box to attach the cover attachment bar to the electrical junction box.

17. The electrical junction box cover plate assembly of claim 16, further comprising the electrical junction box, wherein the electrical junction box has a plurality of mounting screw apertures extending into the electrical junction box and wherein each of a plurality of attachment screw apertures of the cover attachment bar is configured to align with one of the plurality of mounting screw apertures.

18. The electrical junction box cover plate assembly of claim 12, wherein the cover attachment bar has an elongated shape.

19. The electrical junction box cover plate assembly of claim 12, wherein the lip is shaped to form a threaded surface in the cavity and when the cover plate is rotated in a first direction with respect to the cover attachment bar, the cover plate threads onto the cover attachment bar.

20. The electrical junction box cover plate assembly of claim 12, wherein the cover plate provides a screwless look to the cover plate assembly.

* * * * *